(12) United States Patent
Ulivella et al.

(10) Patent No.: US 10,667,343 B2
(45) Date of Patent: May 26, 2020

(54) MODULAR SOLID STATE LIGHTING APPARATUS PLATFORM WITH LOCAL AND REMOTE MICROPROCESSOR CONTROL

(71) Applicant: LIGHTICIANS INC., Van Nuys, CA (US)

(72) Inventors: Richard P. Ulivella, Englewood, NJ (US); Timothy P. Duff, Brooklyn, NY (US)

(73) Assignee: LIGHTICIANS INC., Van Nuys, CA (US)

( * ) Notice: Subject to any disclaimer, the term of this patent is extended or adjusted under 35 U.S.C. 154(b) by 0 days.

(21) Appl. No.: 15/968,326

(22) Filed: May 1, 2018

(65) Prior Publication Data

US 2018/0324922 A1    Nov. 8, 2018

Related U.S. Application Data

(62) Division of application No. 14/932,756, filed on Nov. 4, 2015, now Pat. No. 9,961,738.

(Continued)

(51) Int. Cl.
| | |
|---|---|
| *H05B 33/08* | (2020.01) |
| *G03B 15/02* | (2006.01) |
| *H05B 37/02* | (2006.01) |
| *F21S 2/00* | (2016.01) |
| *F21V 21/096* | (2006.01) |
| *F21W 131/406* | (2006.01) |
| *F21Y 105/12* | (2016.01) |
| *F21Y 105/10* | (2016.01) |

(Continued)

(52) U.S. Cl.
CPC ............ *H05B 33/0863* (2013.01); *F21S 2/00* (2013.01); *F21V 21/096* (2013.01); *G03B 15/02* (2013.01); *H05B 37/0245* (2013.01); *F21W 2131/406* (2013.01); *F21Y 2105/10* (2016.08); *F21Y 2105/12* (2016.08); *F21Y 2113/13* (2016.08); *F21Y 2115/10* (2016.08); *H05B 33/0872* (2013.01); *Y02B 20/48* (2013.01)

(58) Field of Classification Search
CPC ............ H05B 33/0863; H05B 37/0245; H05B 33/0872; F21S 2/00; F21V 21/096; G03B 15/02; F21Y 2105/12; F21Y 2115/10; F21Y 2105/10; F21Y 2113/13; F21W 2131/406
USPC ........................................................ 315/294
See application file for complete search history.

(56) References Cited

U.S. PATENT DOCUMENTS

| | | |
|---|---|---|
| 6,109,757 A | 8/2000 | Stephens |
| 6,948,823 B2 | 9/2005 | Pohlert et al. |

(Continued)

FOREIGN PATENT DOCUMENTS

| | | | | |
|---|---|---|---|---|
| JP | 2015118833 A | * | 6/2015 | .......... F21S 48/1159 |

*Primary Examiner* — Don P Le
(74) *Attorney, Agent, or Firm* — Alston & Bird LLP

(57) ABSTRACT

A solid state lighting platform comprised of one or more modular lighting instruments each of which are comprised of an enclosure, driver/logic module(s) governed by a microprocessor and a unique array of emitter boards consisting of a multitude of lighting elements. The lighting instruments may joined together using magnets embedded in the enclosure(s) and receive control instructions from a smart device or any other light on the wired or wireless network. A unique algorithm and look up table allow flicker free dimming and highly accurate color temperature tuning from the microprocessor.

45 Claims, 17 Drawing Sheets

Related U.S. Application Data

(60) Provisional application No. 62/074,823, filed on Nov. 4, 2014.

(51) Int. Cl.
*F21Y 115/10* (2016.01)
*F21Y 113/13* (2016.01)

(56) References Cited

U.S. PATENT DOCUMENTS

| | | | |
|---|---|---|---|
| 8,506,125 B2 | 8/2013 | Pohlert et al. | |
| 9,279,553 B1* | 3/2016 | Scribante | F21S 8/026 |
| 2009/0079355 A1 | 3/2009 | Zhou et al. | |
| 2010/0327766 A1* | 12/2010 | Recker | H02J 7/025 |
| | | | 315/291 |
| 2012/0068630 A1* | 3/2012 | Li | F21S 41/141 |
| | | | 315/362 |
| 2012/0286699 A1 | 11/2012 | Yan et al. | |
| 2013/0002157 A1* | 1/2013 | van de Ven | H05B 33/0824 |
| | | | 315/192 |
| 2013/0044501 A1* | 2/2013 | Rudisill | F21V 29/70 |
| | | | 362/398 |
| 2013/0099669 A1 | 4/2013 | Collias et al. | |
| 2013/0307777 A1* | 11/2013 | Liu | G06F 3/0383 |
| | | | 345/163 |
| 2014/0068630 A1* | 3/2014 | Fildebrandt | G06F 9/546 |
| | | | 719/313 |
| 2014/0210368 A1* | 7/2014 | Lee | G02B 6/0068 |
| | | | 315/192 |
| 2014/0321120 A1* | 10/2014 | Pas | A61L 9/03 |
| | | | 362/253 |
| 2015/0359061 A1 | 12/2015 | Adler | |

\* cited by examiner

MODULAR SOLID STATE LIGHTING APPARATUS PLATFORM WITH LOCAL AND REMOTE MICROPROCESSOR CONTROL

CROSS-REFERENCE TO RELATED APPLICATIONS

This application is a divisional of U.S. patent application Ser. No. 14/932,756, filed on Nov. 4, 2015, which will issue as U.S. Pat. No. 9,961,738, which claims the benefit of provisional U.S. Patent Application Ser. No. 62/074,823, filed Nov. 4, 2014. The entire contents of those applications are incorporated herein by reference.

FIELD OF THE INVENTION

The field of this invention relates to flicker-free solid state lighting devices with aesthetically pleasing light quality, accurate color temperature, adjustability & programmability; no flicker; ability to be mounted to various industry rigging equipment; upgradeability/easy repairs; and recyclable components. The lighting instruments described herein can be used in lighting film, television, and still photography applications.

BACKGROUND OF THE INVENTION

Lighting a film or television scene is a highly complex process. Lighting technicians must balance many considerations in building an appropriate lighting configuration for a film or television scene. Key considerations include managing tight on-set space and power constraints, avoiding flicker when filming, providing adequate adjustability of color temperature and hue of light, managing budget constraints, and maximizing the efficiency and portability of the light source.

Historically, lighting technicians have relied upon incandescent (e.g., tungsten-halogen), fluorescent, and arclight instruments (collectively, referred to herein as "historical" lighting systems). These historical lighting systems can hinder production teams as a result of their high energy requirements, size, and lack of versatility. Therefore, in order for these lighting systems to be run, large power conversion devices may be required, increasing costs and decreasing ease of use. Furthermore, these historical lighting systems may require dimming devices and other accessories in order for the lights' color, quality, or intensity to be adjusted. As a result, historical lighting systems have remained cumbersome, costly, and difficult to set up.

Additionally, when lighting a subject for a film, television, or other type of photographic shoot, a lighting technician faces the challenge of matching or replicating a specific color temperature or light hue. Historical lighting system solutions require the installation of consumable gel media or the swap of bulb in order to adjust color temperature. Not only are these methods slow and inefficient but they do not allow for continuous adjustability throughout the range of colors. Historical lighting systems also suffer from color temperature drifts as a result of dimming, ambient temperature changes, bulb life, gel media quality, or other conditional changes.

Another method of controlling the intensity and brightness of these historical lighting systems is by attenuation. Attenuating a historical lighting source is typically achieved through the reduction of the voltage flowing through the lamp, which thereby reduces the total amount of energy passing through the filament and light produced.

More recently, solid state lighting has begun to be used for these applications. Solid state lighting systems are generally comprised of semiconductors or semiconducting elements. Solid state lighting solutions provide lower total costs, less bulk, and increased efficiency. However, solid state lighting is not without its drawbacks.

For one, in some circumstances, lighting technicians have simply attempted to create retrofit systems, which involved replacing incandescent, halogen, or arclight light sources with standard high-output class LED lights. Although the light source, such as the bulb, may be solid state, the overall design of the rest of the light remains unchanged. These retrofit systems often lack any novel improvements since fundamentally the light system functions the same as with a historical light source. Since the thermal design and optical system remains unchanged, color renditions can lack accuracy and richness, and color rendering index (CRI) values that are as low as consumer level LEDs. As a result, many of these lights also are susceptible to flickering when used in film and television settings.

Non-retrofit solid state lighting systems often cost more to design and build as a result of the classical method of combining emitters on the same substrate or frame, which involves arranging emitters of two different color temperatures and alternating them in either a "candy stripe" or "checkerboard" pattern along the lighting instrument. These emitter arrangements alternate color temperature every other emitter or every other row. For example, U.S. Pat. No. 8,506,125 B2 ("the '125 patent") claims an illumination system consisting of "two groups of semiconductor light elements each individually emitting light in a daylight or tungsten color temperature range." In the '125 patent, checkerboard and striped patterns are discussed as a means of integrating "a plurality of semiconductor light elements." One notable problem particular to checkerboard patterns is that it is not possible to cleanly integrate resistors because the emitter density is uniform throughout and there is no natural space left for any of these features. It also is more difficult to route signal traces on the printed circuit board since the common neighbors do not exist.

As stated above, solid state lighting sources conduct, and therefore emit light, only when fed a specific voltage or very narrow range of voltages. Variance of only a few hundredths of a volt up or down from that design voltage will result in interrupted electron flow and therefore no light emission. Other solid state lighting semiconductors and alternative light emission technologies have this same narrow voltage range of operation. The fixed forward voltage of solid state lighting elements presents a few unique challenges when it comes to attenuating their output levels and maintaining their stability.

For instance, current solid state lighting systems exhibit negative effects when attempting to change color temperature or intensity, crucial capabilities to meet the demands of today's production teams. When changing color temperature, other solid state lighting systems lose significant output while also changing the shape and quality of light that is output. When this happens, shadows tend to fall differently on lit subjects, requiring technicians to have to further adjust the lighting for the scene. Additionally, current solid state lighting systems do not have discrete and precise control of the intensity of the lighting system, which hampers the ability of production teams to properly light scenes.

Currently, there are two accepted methods for attenuating the output levels of a solid state lighting source: current control and pulse width modulation. Current control is the simple regulation of current flowing through emitter clusters or other solid state light emission devices. While this is similar in effect as the reduction in voltage involved in the attenuation of a classical light source as discussed above, the voltage in this case remains constant in order to satisfy the forward voltage requirement, but the reduction in current results in reduced light output. Current control inherently results in relatively flicker free performance and reasonably stable light output, but such designs require large passive components to filter out ripple effects due to current regulation. Furthermore, it also results in color shifts and a lack of precision control below 10% of the emission device's standard current consumption. Often times, specialized and expensive regulation is required below the 10% threshold and the color results are still greatly compromised.

The other accepted method of attenuating solid state lighting output is Pulse Width Modulation ("PWM"). It functions by rapidly switching emitter(s) on and off in a cyclic manner, thereby reducing light output as perceived by a human eye, sensor, video camera, film emulsion, or other recording or measuring device. The longer a percentage of time the emitter is on and making light, the brighter the average illuminance appears. If this switching is sufficiently rapid, the human eye cannot see the flashing but perceives a reduced brightness because the brain "smoothes out" the rapid flashes. The frequency at which this begins to occur is at least 20-30 Hz, just like a television or motion picture projector. However, when photographing emitters that are dimmed using this technique, the film or digital camera can perceive the switching and the result is a "temporal artifact" which looks like banding, partially exposed frames, or an entire bank of emitters that appear off. These artifacts are caused by the shutter of the camera being in transition from open to closed or closed to open during a time when the emitters are in their off state of the pulse-width cycle.

Conventionally, the industry approach to solving this problem involved speeding up the switching frequency. By increasing the switching speed to a few thousand times per second (greater than 1 kHz) most cameras operating at normal shutter speeds can no longer discern the pulsing and instead see a smoothed, but attenuated, average intensity just like the human eye. However, this higher switching frequency results in a higher complexity design and the need for more expensive transistors or other switching devices. Additionally this technique is limited to only the most basic of photographic application because many advanced cameras run at many various shutter speeds, effectively nullifying the gains resulting from the higher switching frequency. For instance, a high speed camera would still discern flicker. Increase the switching frequency even more and the problem still occurs even at some minute level. Non-global shutters further complicate the matter by sampling (or exposing, in photographic terms) pixels in stripes or segments of the final image instead of sampling the entire frame at once.

PWM has another limit, at very high switching frequencies (greater than 1 MHz), which could be flicker free in photography even at very high frame rates, the switching transistors have to be incredibly specialized types used in radio transmission. Therefore, the very act of switching these transistors on and off at these high frequencies result in radio emissions. Thus, there is an upper speed limit of practical PWM.

In addition to suffering from flicker and the difficulty of attenuating the light source, existing solid state light instruments can only function as a single sized stand-alone instrument, and do not scale in any way. This lack of modularity limits the usage of any one particular lighting instrument. The only way for these panels to appear as if they provide a single larger light source is to put them on separate stands, rigs, or bracketry and place them next to each other. However, each instrument is then controlled and operated as a separate device and requires numerous accessories in order to be positioned in a way that makes them appear to be a single light source. For instance, US Pat. Appl. No. 20130099669 A1 ("the '669 application") discloses a method in which different lighting instruments can be grouped together on a network and manipulated as one light source. This makes uniform lighting adjustments much easier, but since the lights lose their individual identification on the network, the user is forced to manipulate them all as one unit which eliminates the added flexibility and control of light accuracy.

Furthermore, existing solid state lighting instruments are designed and manufactured in a way that make repairs and upgrades very difficult for consumers. Repairing burnt out or malfunctioning emitters require the consumer to send the light back to the manufacturer or requires a specialist to be sent onsite and repair or replace any malfunctioning elements of the light. This creates a major issue for users, who end up losing money when they are not able to rent or use equipment during repair time. Another problem with this approach to manufacturing is that users cannot upgrade the emitters, microprocessors or firmware when they become outdated.

BRIEF SUMMARY OF THE INVENTION

The object of the present invention is to provide a solid state lighting platform that solves the PWM flickering issues in the prior art, while allowing for easily attenuated lights by way of a user-controlled interface that drives a wide range of emitter types to allow for adjustable color temperature in a modular form. By combining a unique array of solid state emitters with a novel algorithm to control said emitters via a modified PWM method, the present invention solves the prior art flicker problem while also providing for light attenuation.

Furthermore, by utilizing a combination of high and low accuracy emitters, and emitters in the Tungsten light range (typically ranging between 2700K-3400K) and the daylight range (which is roughly 5000-10000K), an embodiment of the present invention can provide flicker-free, attenuated light across a broad range of color temperatures. A low accuracy emitter is a white light element which comprises wavelengths which aggregate to a color temperature in the daylight or tungsten range, which is typically measured in degrees Kelvin and falls along the black body locus on the standard CIE chromaticity diagram. Daylight is approximately 5600-7000 degrees Kelvin, while tungsten is approximately 2500-3200 degrees Kelvin. Low accuracy emitters have several gaps or dips in the spectral content after wavelength conversion, whereas high accuracy emitters do not have said gaps or dips in the spectrum.

An embodiment of the present invention combines all of these capabilities in an easily portable modular format that allows multiple panels of lighting platforms to be combined and controlled uniformly or individually from a single control source, allowing for easily scaled lighting systems that simultaneously satisfies both the demands of the production team and the constraints of the shooting environment.

A preferred embodiment of the present invention utilizes light elements, which are typically arrangements of four different types of LED emitters comprised of two different color temperature LEDs of two different accuracies in a woven pattern of overlapping "circles" or herringbone array (referred to herein as "woven circles"). (See FIG. 14).

A woven circle arrangement is an arrangement of devises in a pattern of overlapping circles of equal or similar size and offset to form a grid, whereas a herringbone pattern is an alternating grid of parallelograms or rectangles which resembles the bones of the herring (fish) where each row and column stagger and diagonal alternating stripes form at the intersections. This allows the columns (vertically oriented blocks) to be left for wiring and other circuitry, while the rows (horizontally oriented blocks) are left for positions of emitters. By alternating vertically and horizontally, the four different emitter types spread evenly or cluster towards the center of the emitter board to either optimize uniformity or peak beam candlepower.

These LED emitters can be in the form of single wavelength elements, which emits a single narrow wavelength of light, such as red, blue, or ultraviolet, or white light elements, which has a wavelength conversion substance or material applied or placed in front of it by some other means. In a white light element, the single wavelength of light is absorbed by the wavelength conversion substance or material and re-radiated as multiple wavelengths. White light comprises an aggregate of many wavelengths of light.

The illumination levels for all of the lighting elements in the platform are governed by a microprocessor and driver circuitry with look-up table(s) that determine the exact mixture based on the user's desired settings. This look-up table is populated with the precise output values to properly power the lighting elements in the lighting platform according the inputted requirements provided by the user, where an algorithm calculates the output values as a function of the input values so as to pulse the light in such a manner so as to avoid flicker.

The emitters are driven with a combination of the classical method of current regulation with a new and novel switching method that avoids the inherent limits of current regulation (it does not have to go below 50% to be effective) and extends the stable and precise range of switched dimming to usably low and highly desired levels. Emitters are driven in groups, out of phase, to further enhance flicker immunity. The layout of emitters combined with the out of phase drive is uniquely suited to on-camera applications since no elements are ever temporally aligned.

Furthermore, in an embodiment of the present invention, multiple inventive lighting units are coupled together allowing them to function as one single unit. Control can be distributed across a wireless or wired network to an individual unit or multiple units. All data and settings can be accessed from any light or from an application on a smart phone, tablet or personal computer, or a dedicated controller device, trigger, or accessory. The data and settings from each unit can be saved or shared through various means, enabling the user to recreate the settings of each light at a later time or different location, wherein the settings also can be transferred to different lights or to multiple lights, as long as their network key or other security means is adjusted to match the network key or other security means of the lights whose settings were saved.

Alternatively, the inventors have developed another way of solving the same problems of the lighting industry as described above. This alternate embodiment of the present inventions employs a mechanically or piezoelectrically precisely positioned rotating disc, sliding plate, or otherwise shaped cover at the emitter or emitter cluster level comprising wavelength converting material that converts narrowband light energy into broadband white light.

BRIEF DESCRIPTION OF THE DRAWINGS

Figure 1:
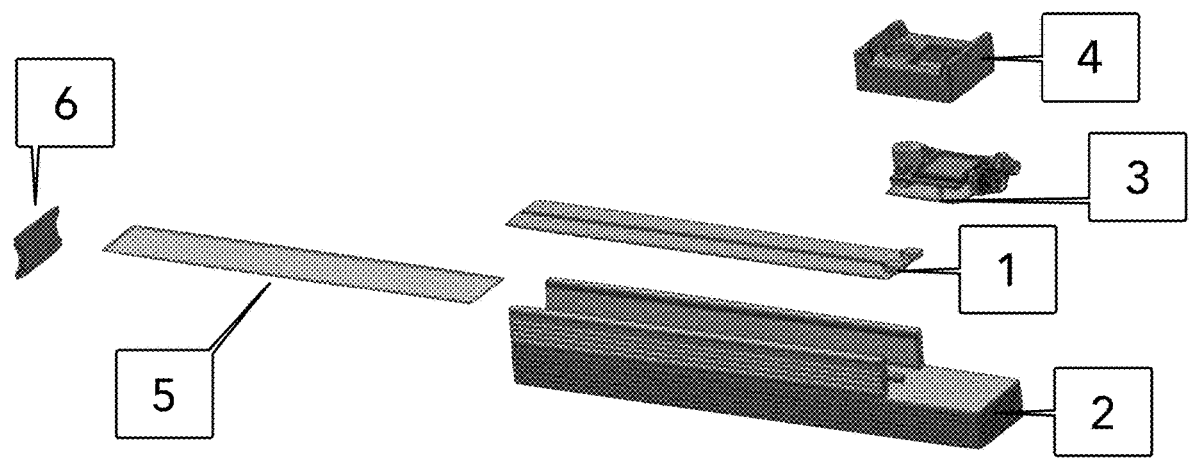
Figure 2:
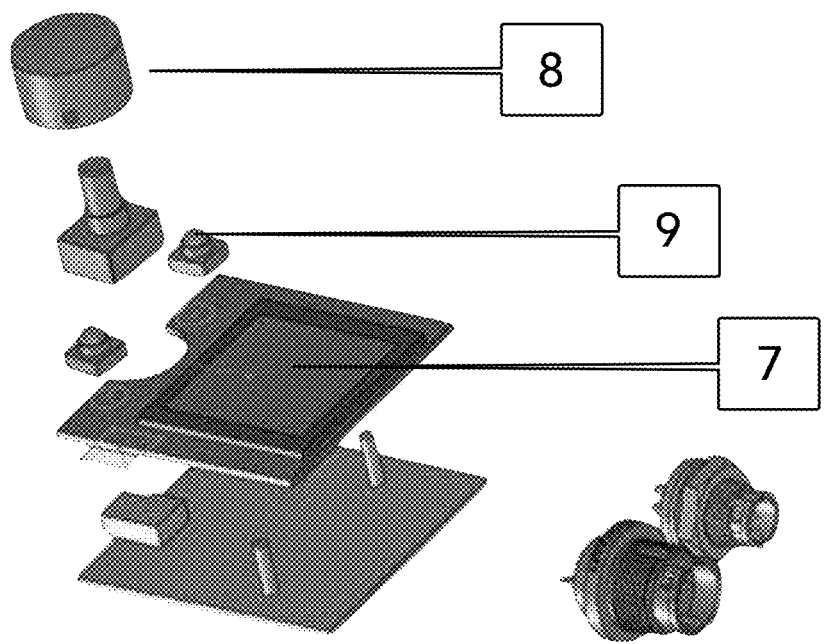
Figure 3:
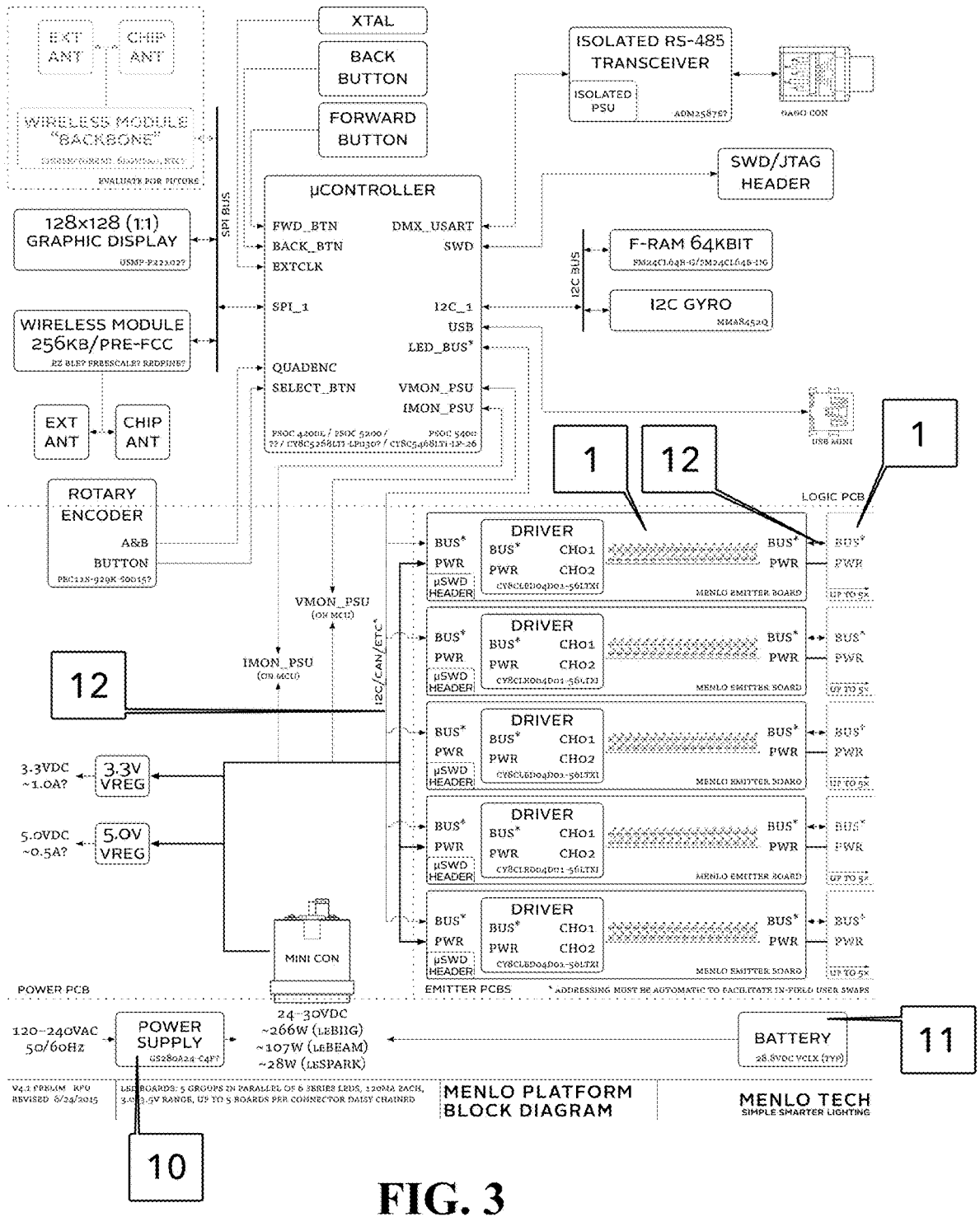
Figure 4:
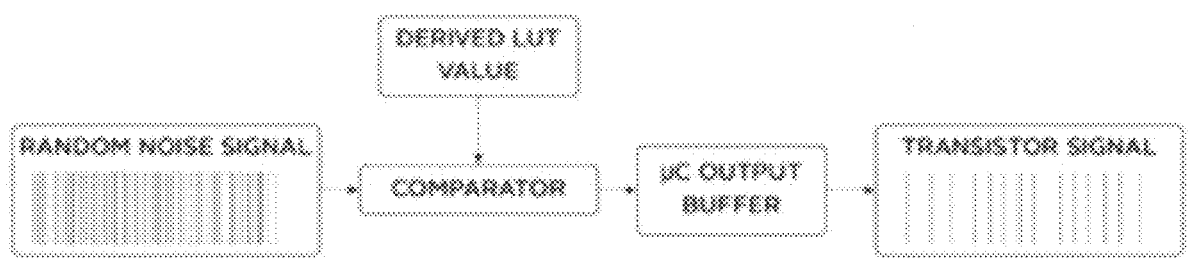
Figure 5:
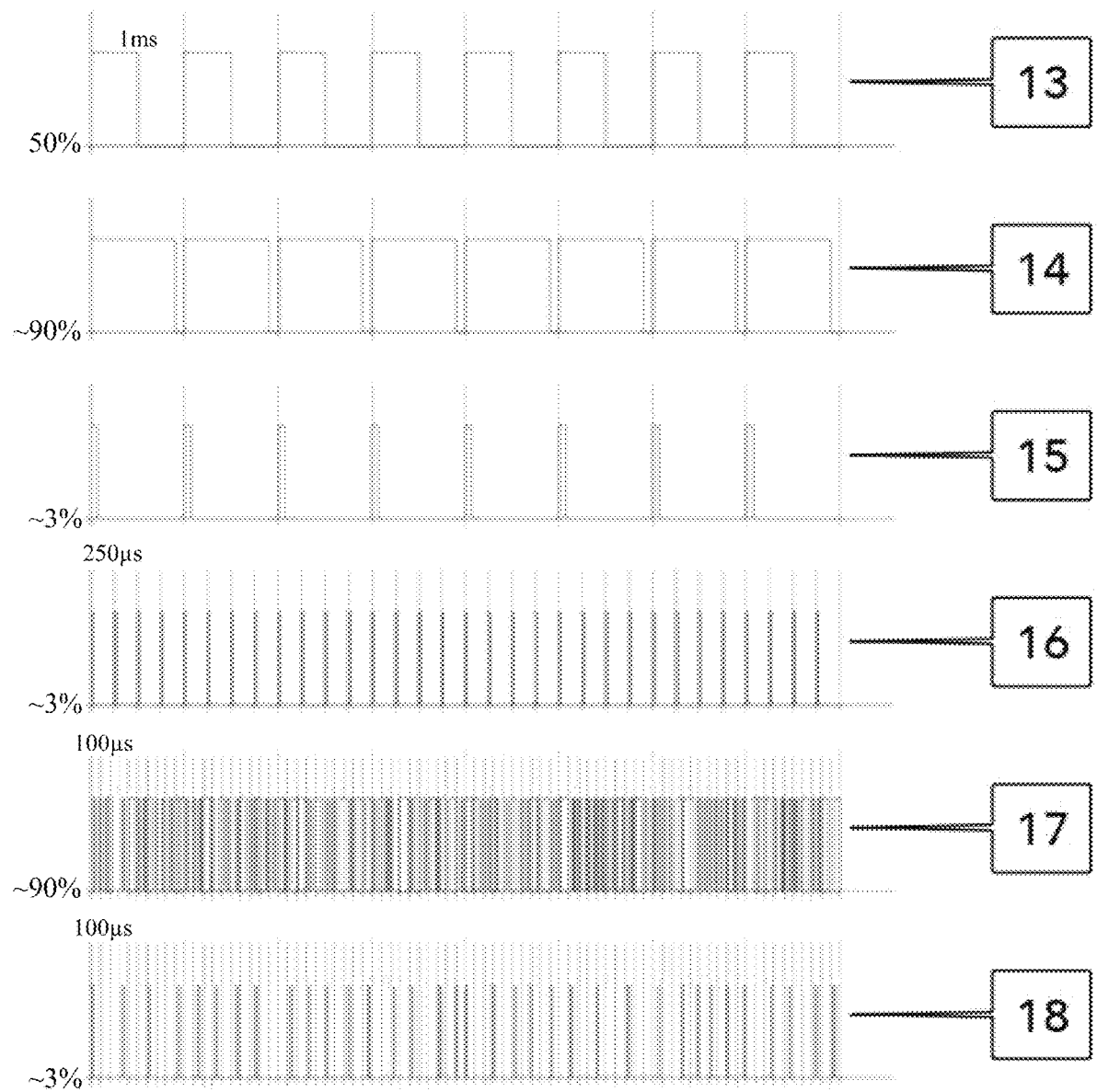
Figure 6:
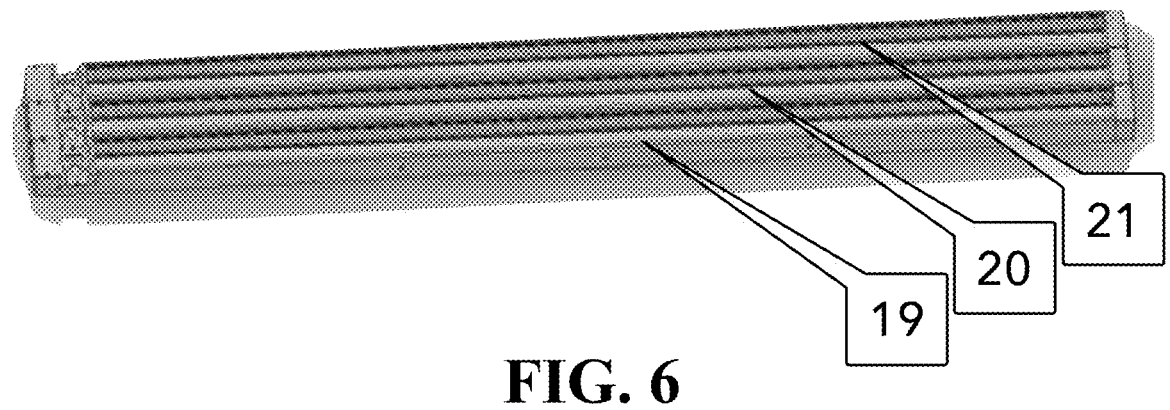
Figure 7:
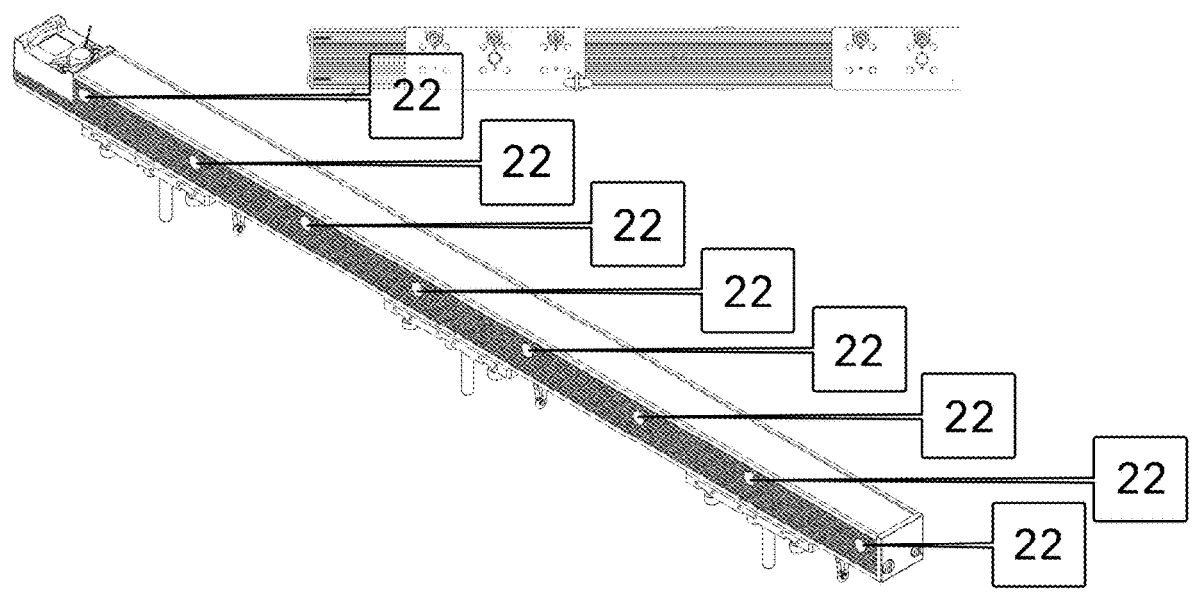
Figure 8:
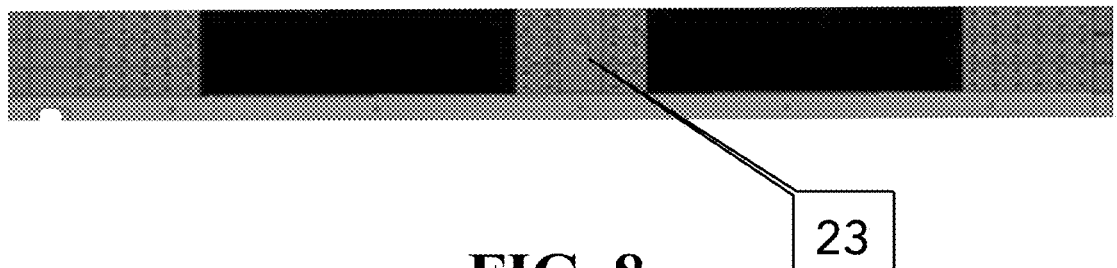
Figure 9:
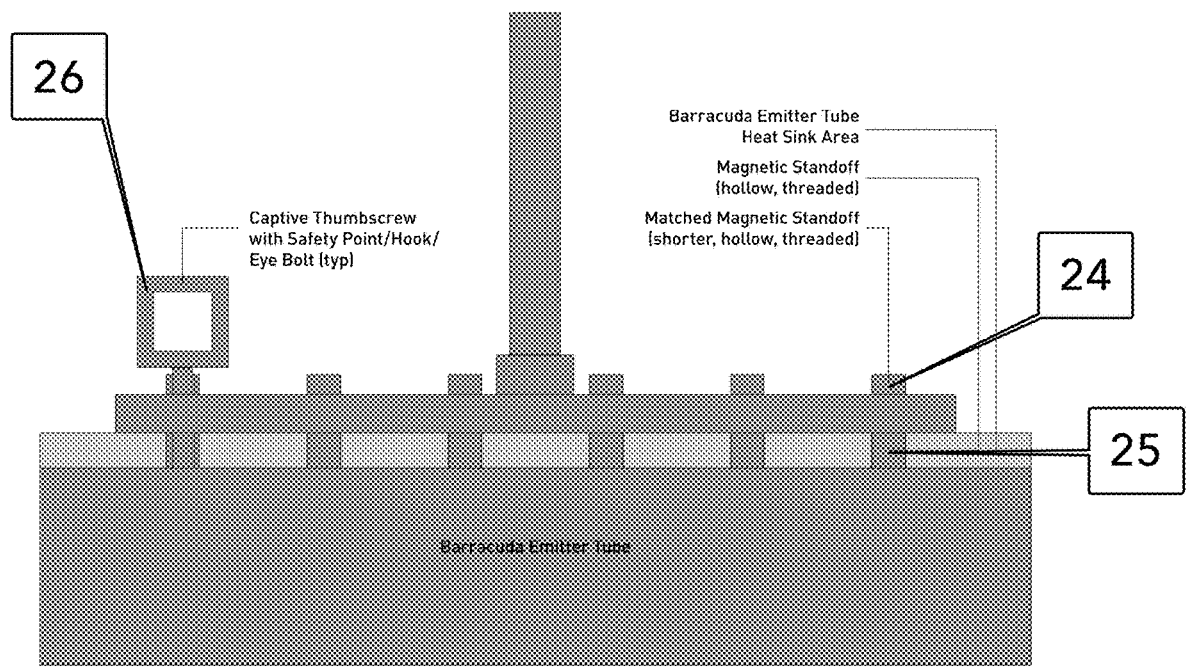
Figure 10:
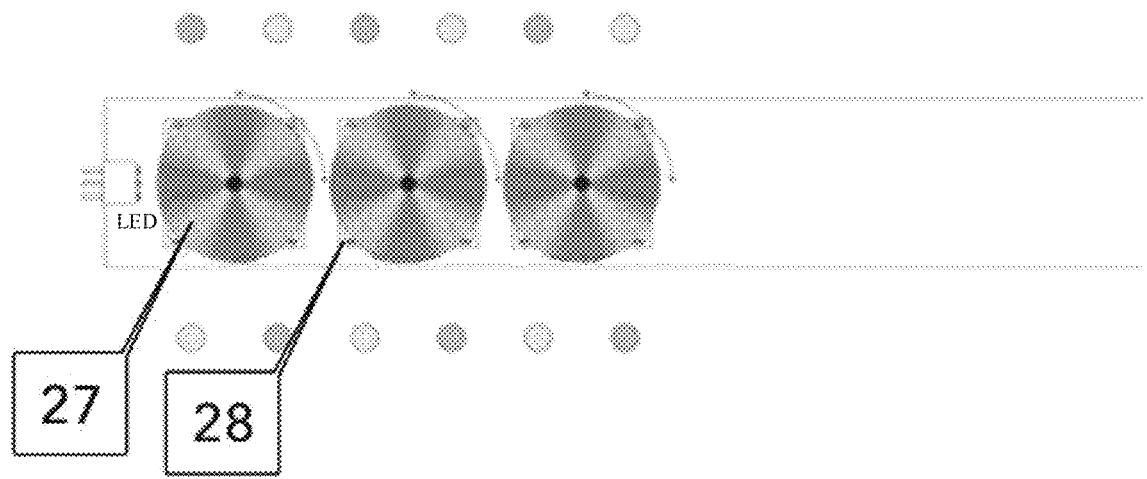
Figure 11:
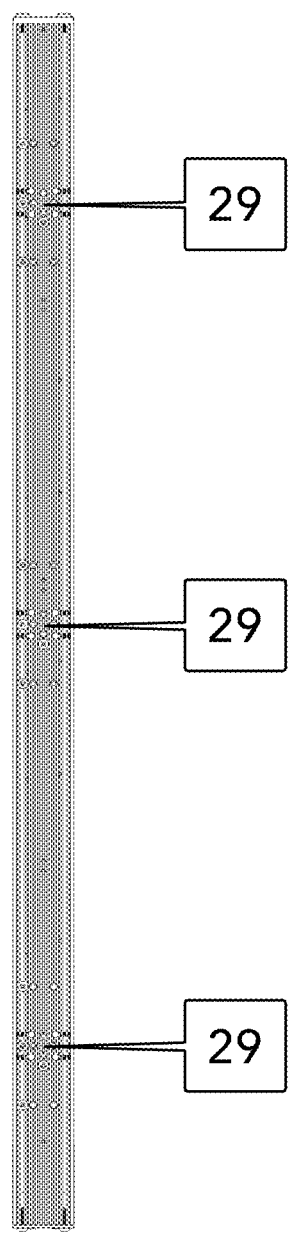
Figure 12:
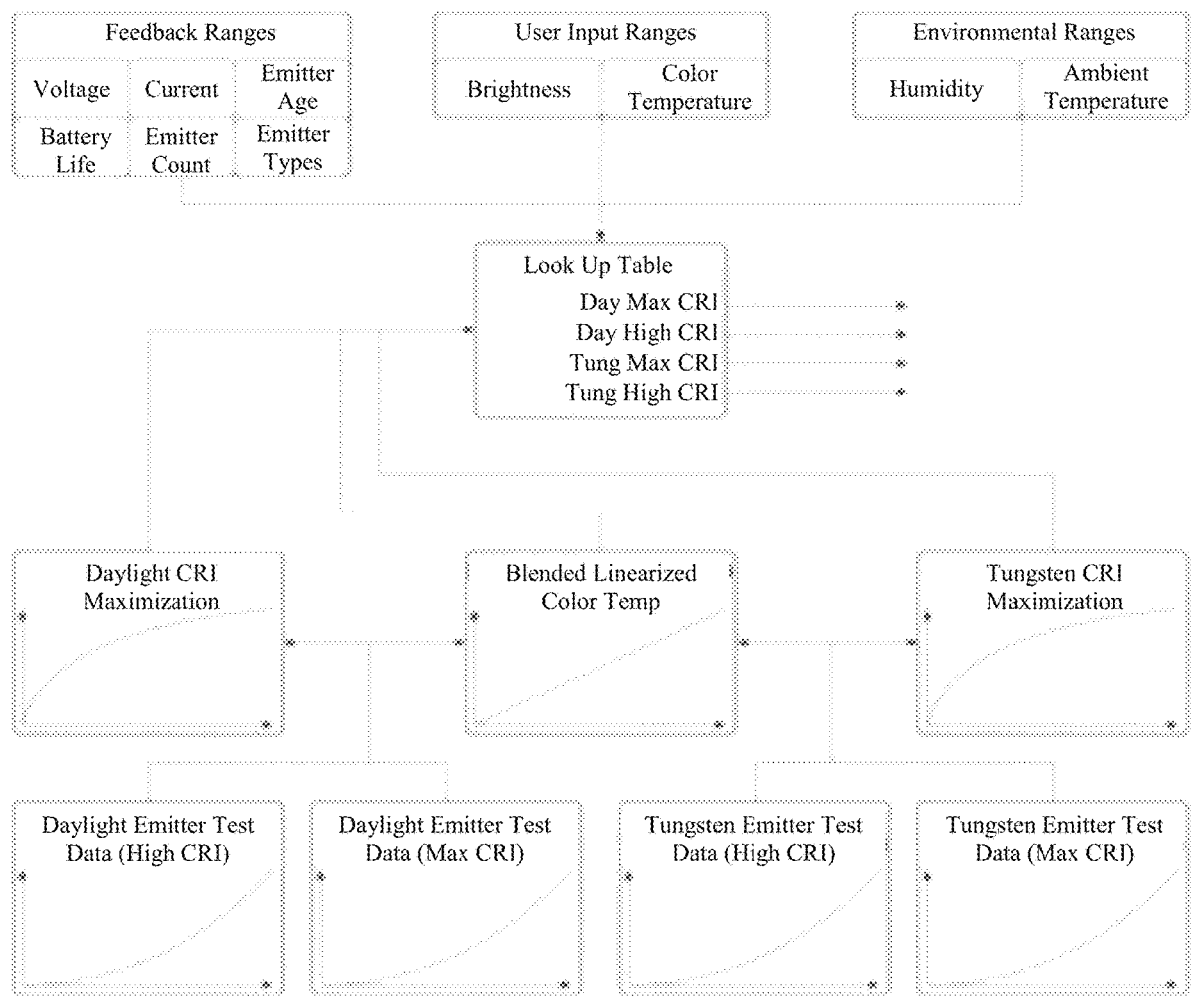
Figure 13:
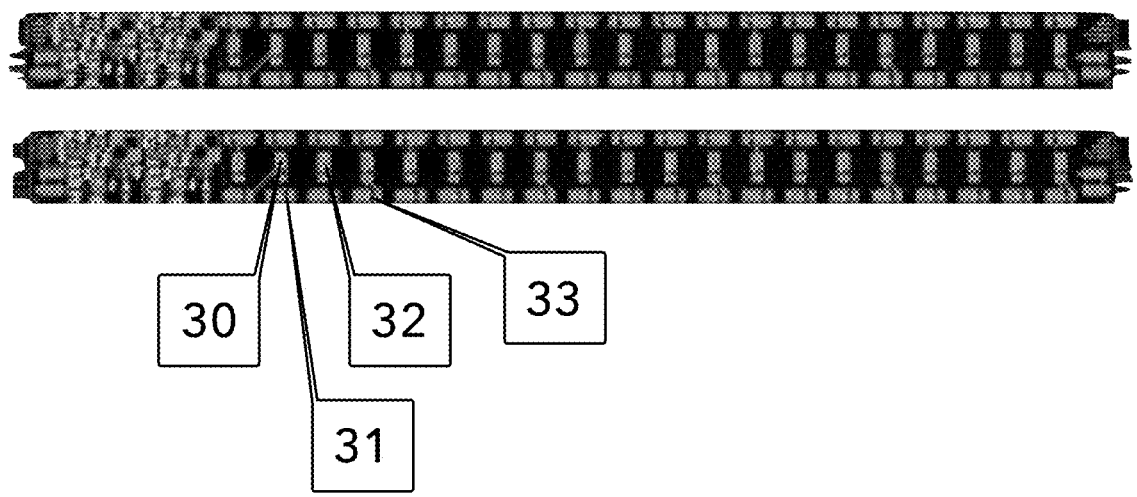
Figure 14:
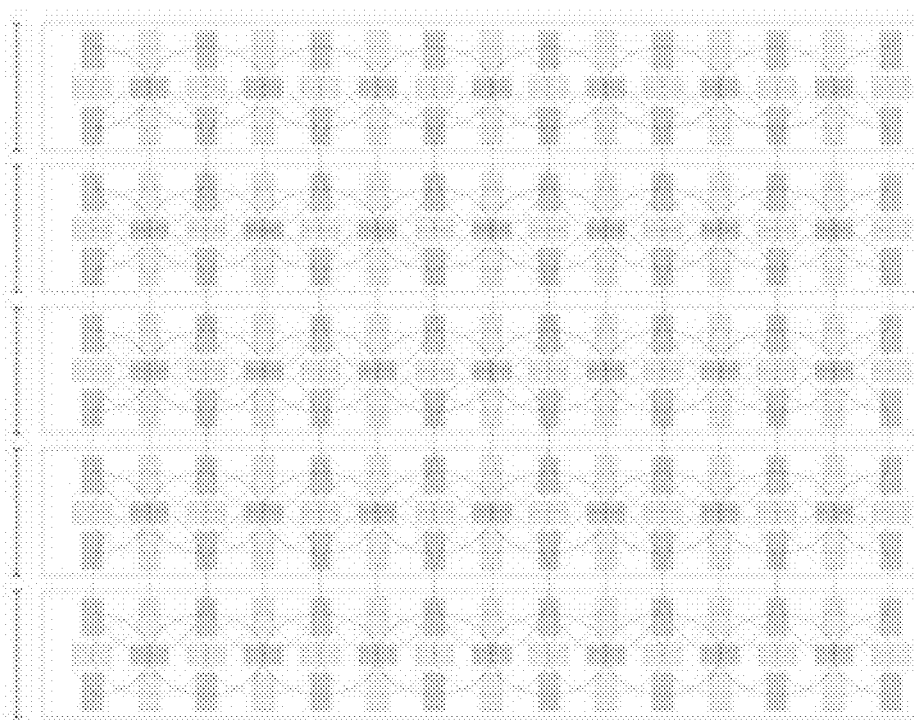
Figure 15:
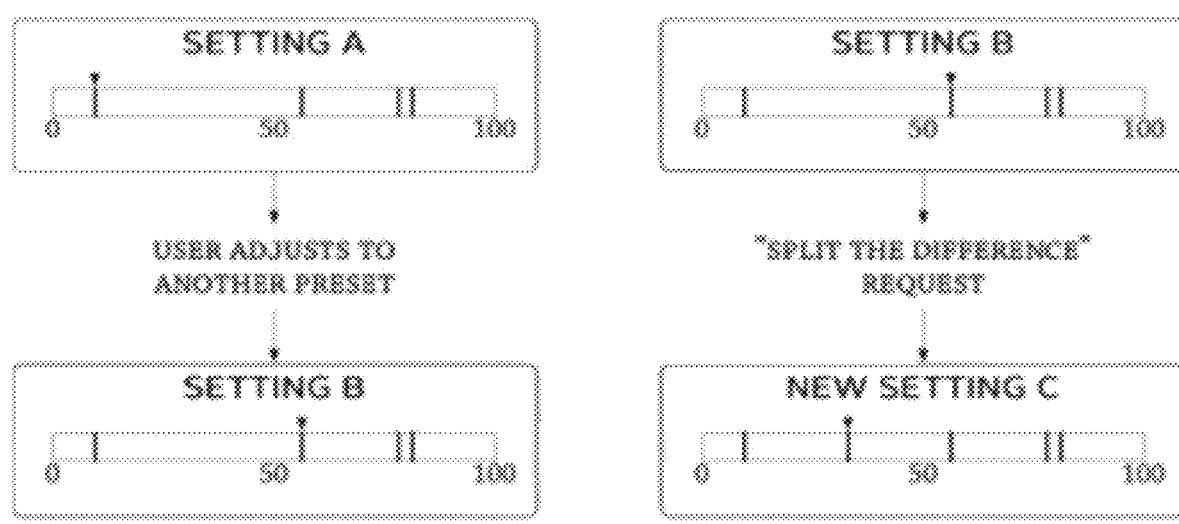
Figure 16:
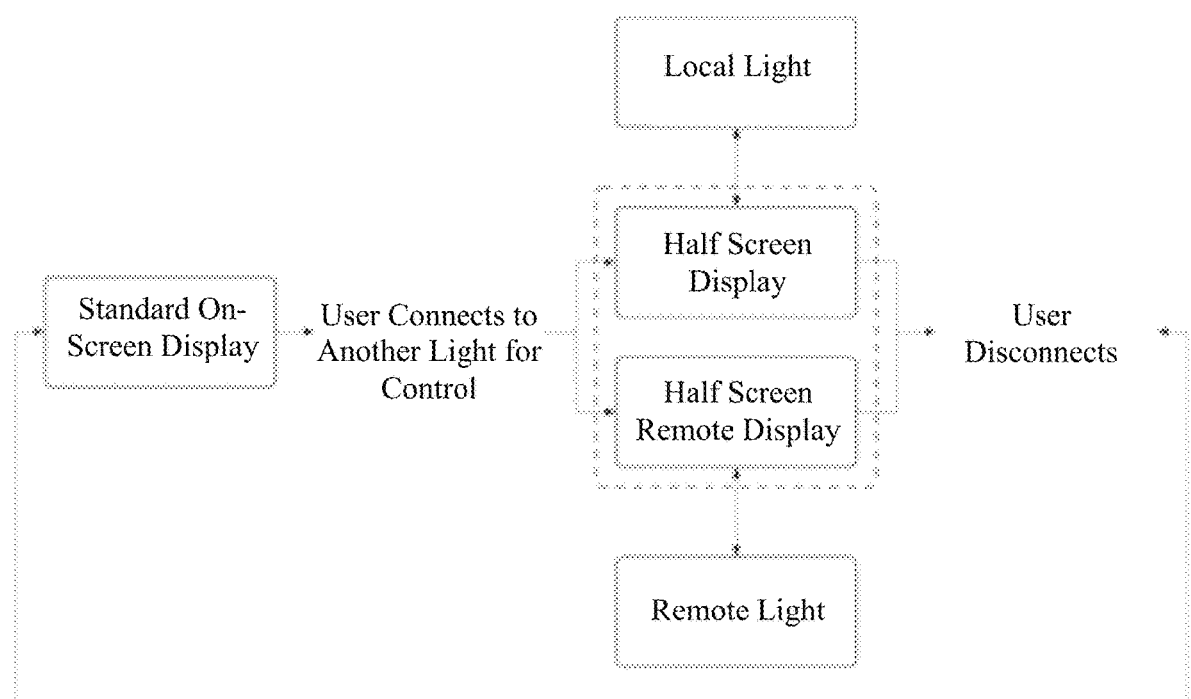
Figure 17:
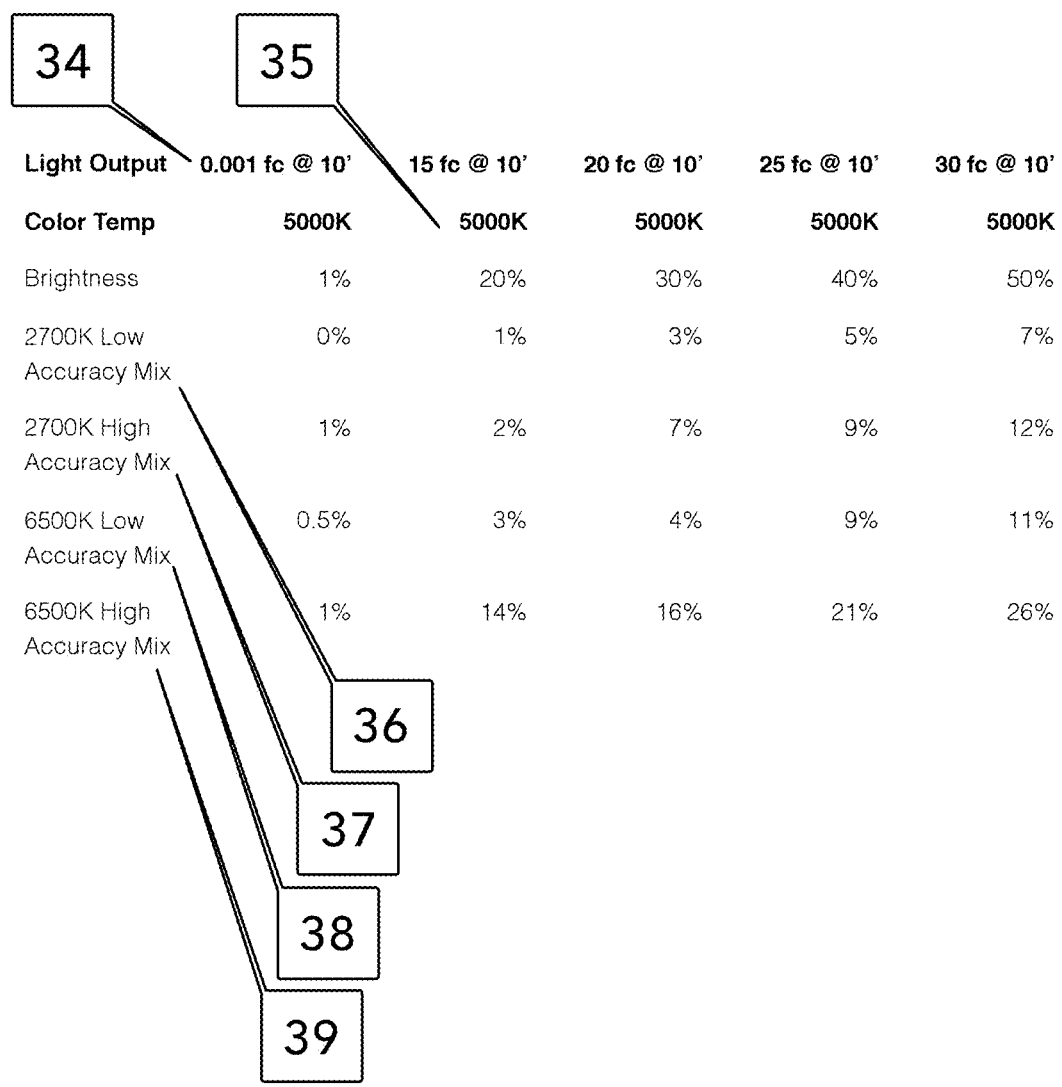

Having thus described the invention in general terms, reference will now be made to the accompanying drawings, which are not necessarily drawn to scale, and wherein:

FIG. 1 is an exploded view of a preferred embodiment of the invention;

FIG. 2 is an exploded view of a preferred embodiment of the logic/power/driver and user controls of the invention;

FIG. 3 is a block diagram depicting the architecture of the modules of the invention;

FIG. 4 is a schematic view of the unique algorithm by which solid state lighting devices output can be attenuated without flicker;

FIG. 5 is a plot of the waveform as output by the algorithm in FIG. 4;

FIG. 6 is a preferred embodiment of the invention depicting two or more lights attached together;

FIG. 7 is a preferred embodiment of the invention depicting the magnetic arrays which enable multiple lights to be attached together;

FIG. 8 is a preferred embodiment of the backplate mounting device when mounted to the invention;

FIG. 9 is a detailed view depicting the magnetic sleeves and twist or screw mechanism for mechanical safety mounting;

FIG. 10 is a detailed view depicting a preferred embodiment of the mechanical or piezoelectrically positioned covers for color temperature adjustment;

FIG. 11 is a view depicting the back of the invention and magnetic arrays for attaching the backplate;

FIG. 12 is a block diagram depicting the algorithm used to generate the look-up table(s);

FIG. 13 is a detailed view of the invention in FIG. 1 depicting the emitter board/light engine which has been highlighted to denote low accuracy emitters vs high accuracy emitters;

FIG. 14 is a detailed view of the invention in FIG. 1 depicting the emitter board/light engine "woven circles" layout;

FIG. 15 is a detailed view depicting the split-the-difference and radio-tuner user interface models;

FIG. 16 is a schematic view depicting program functionality when using the split-screen user interface model; and FIG. 17 is an example of the look-up table used to compute color temperature and brightness.

DETAILED DESCRIPTION OF THE INVENTION

In an embodiment, light engine(s) combine two or more Light Elements, with the preferred embodiment using four, low accuracy daylight [FIG. 13, #30], high accuracy daylight [FIG. 13, #31], low accuracy tungsten [FIG. 13, #32], and high accuracy tungsten [FIG. 13, #33]. In order to avoid the negative effects of checkerboard and striped patterns, an embodiment of the present invention combines all four of these emitters in unique woven circles, as shown in FIG. 14, or a herringbone pattern. Additionally, in contrast to the system described in the '125 patent, which discloses "a user-activated illumination control for controllably setting different selectable illumination levels respectively for said groups of semiconductor light," An embodiment of the present invention utilizes a microprocessor and look-up table that governs the exact mixture of illumination levels for all four emitter types included in the preferred embodiment.

The preferred embodiment of the present invention combines all four of these emitters in woven circles, as shown in FIG. 14, or a herringbone pattern. This enables high color accuracy while packing the emitters very closely together so the colors blend smoothly without the pixelation or banding of other techniques. By using the 2538 emitter size, 5050 emitter size, 5730 emitter size, other Surface Mount Device (SMD) size, a custom emitter or chip-on-board package, or a high power emitter size and by using the woven circles layout, there is a natural space left between the emitters for the other necessary passive components, driver circuits, mechanical parts, thermally conductive features, weight reduction board cutouts, vias, and other various board-level details. Without this unique layout, an emitter would have to be eliminated or a more costly measure such as bottom-loading the passives. Although a striped pattern leaves space for some passives and traces, it does so at the expense of uniform distribution of emitter types, causing ragged or striped shadow patterns, neither of which look natural nor light faces and other photographic subjects smoothly.

Since the emitters are arranged in woven circles or a herringbone pattern, the shadows produced will appear much more like a point source or natural soft source. One Printed Circuit Board (PCB) can control two different color temperatures (one in the tungsten range, or approximately 2700K, and another in the daylight range, or approximately 6000K) and uses a microprocessor to precisely vary a mix of the light output to arrive at any color within that range. The preferred embodiment of the present invention combines these two color temperature ranges, but other embodiments of the present invention can utilize more color temperatures as well. The upgradeable design and easily replaceable modules enable this flexibility without replacing the entire light.

In an embodiment light engine(s) [FIG. 1, #1], an enclosure/light body/heatsink [FIG. 1, #2], a logic/driver/power module [FIG. 1, #3], a logic/driver/power module cover [FIG. 1, #4], an optic or diffuser [FIG. 1 #5], magnetic mounting arrays for mounting brackets and backplates [FIG. 11, #29], magnetic arrays for attaching lights to other lights and/or accessories [FIG. 7, #22, an endcap/cover [FIG. 1, #6], and an external power supply or battery [FIG. 3, #10, #11] are arranged as depicted in FIG. 1. In an embodiment, within the logic/driver/power module [FIG. 2], several sensors have been included to measure device conditions in addition to environmental conditions. Some of these parameters may be, for example, orientation, compass heading, movement (sudden or continuous), altitude, temperatures, ambient light, humidity, or other relevant parameters. In another embodiment, within the same module, several means of communications may be included, for example 802.11 WiFi, 802.15.4 Zigbee, Bluetooth, Bluetooth Low Energy/Bluetooth Smart, Z-Wave, other wireless, Ethernet, DMX-512, Dali, or other serial networks. Finally, within the same module, alternative communications means may be included in another embodiment, for example IrDa infrared, serial data signal lamps, etc. A graphical display [FIG. 2, #7] may be included to report the light's settings and measured parameters. A multi-function array of buttons and rotary controllers [FIG. 1, #2, #3] enable the user to adjust and control the light. In the case of an older light which lacks both the display and the buttons, a more simplified and space-conscious interface may be employed, for example a combination of IrDa/signal lamp(s), indicator lamp(s), pulse codes, etc. and one or more of the aforementioned wireless network(s). This allows the user to trigger lighting cues, presets, effects, and other parameters using sensors built into mobile devices, accessories, or into the light itself. This can be aggregated data from multiple devices or a simple trigger where the light sensor or proximity sensor would initiate changes based on thresholds or conditions.

Driver independence enables select areas of the light to be darker or brighter than others. This enables accurate simulation of firelight, flame bars, video screens. Integration with wirelessly connected devices enables live use of a camera as a video/light source or patterns encoded into the software. A "write on the light" where a finger or stylus input device enables direct interaction and animation of pixels. This can be done both "locally" within a fixture, or "distributed," such as over a network or autonomously with initial conditions and a sync pulse or heartbeat signal.

The Look-Up Table utilized by the preferred embodiment of the present invention is a rapid and processor efficient means of translating inputs into outputs. Consider an array of values as a simple example, where the heading rows contain increasing amounts of light [FIG. 17, #34] and color temperature [FIG. 17, #35] and the remainder of the rows [FIG. 17, #36-39] are the output mixture "recipes" needed to achieve that intensity. This can be expanded this into many more dimensions for color temperature, environmental conditions, age of emitters, and other variables. Another embodiment of the Look-Up Table is a multivariable equation evaluated before run time in the lab for many discrete variations of input.

The user selects intensity and color balance by numerical readout or computer display, rotary encoder, dial position, or wireless control through an app, embedded web server, or other means. The microprocessor then receives the user input and determines the exact mixture of four emitter outputs to yield the desired color balance and brightness. The look-up table will be determined and calibrated at time of manufacture, allowing for consistent and easy use as soon as the system is deployed. Additional effects such as thermal effects, manufacturing lot variations, age of emitters, and others can be measured and fed forward into the look-up table to provide many more years of consistent operation than alternative attempts to provide variable color temperature solid state lighting systems, such as the "cross-fader" claimed in the '125 patent.

Furthermore the "desired result" can be expressed in a variety of units not possible with cross fader control, such as degrees Kelvin, percentage of total light output power, light output power in lumens, foot candles at 8', camera exposure in f/t-stop with camera settings input elsewhere in the user interface. A cross fader control does not enable precise user color or intensity settings. Further, a microprocessor can include thermal, humidity, barometric pressure, current drift, and other environmental telemetry in its algorithm for arriving at the exact mixture. This enhances the performance, longevity, reliability, and efficiency of the instrument.

An embodiment of the present invention employs a unique algorithm, as shown in FIG. 4, which switches emitters on and off in a manner that allows it to avoid the repeating or cyclic switching pattern [FIG. 5, #13-16] that plagues the solid state lighting systems of today. The pattern is randomized so the waveform does not look like a repetitive square wave but instead looks like "noise," as indicated by the signals shown in FIG. 5 [FIG. 5, #17-18]. The random noise is modulated to achieve an average intensity. Random noise switched at a very high frequency (greater than 10 kHz) is completely flicker free for nearly all live-action photographic applications because of the incredibly high rate and the lack of a pattern in the on/off cycle of the emitters. As an added effect, switching of random noise greatly attenuates the radio broadcast byproducts associated with any periodic switching at any frequency.

The present invention employs a microprocessor and algorithm that looks up a user desired value, for example, if 20 foot-candles (fc) @10' and 4100K are provided as inputs, and the algorithm determines that a mix of 51% low accuracy tungsten, 80% high accuracy tungsten, 22% low accuracy daylight, and 60% high accuracy daylight is required to achieve that exact output. The processor adjusts the PWM duty cycle of its output pins to strobe at those percentages and the strobing will be randomized and flicker free. The microprocessor monitors the voltage and current flowing from the power supply stages and the Metal Oxide Silicon Field Effect Transistor (MOSFET) drivers and continuously adjusts the duty cycles to compensate for drift, thereby always guaranteeing that what the user set is what the light delivers. If it is not possible to achieve the user's settings or there is a partial component failure, the user is notified through a variety of means, such as a notification on a display means or remotely connected control device.

The present invention combines the classical method of dimming LEDs by way of current regulation and this new novel randomized switching technique to extend low intensity range and precision. Below a specified minimum value of switching, the randomized pulsed signal becomes difficult to regulate. In the present embodiment, that is 10%. Below 50%, color accuracy suffers with current control. By combining these two methods using the Look-Up-Table algorithm, color accuracy is maintained and the useful range of and precise intensity control extends below 1% or even 0.1%.

The randomized switched drive is applied to emitters in groups, with the switching cycles of each group out of phase, to further enhance flicker immunity. The interwoven or herringbone layout of emitters combined with the out of phase drive is uniquely suited to flicker-free photographic applications since no elements are ever temporally aligned.

Control from a rotary encoder will allow for quick commands that can bypass the menu screen. For example, when adjusting color temperature and brightness, holding down the encoder will save that setting, then allowing the user to continue adjusting these qualities. If the user double clicks the rotary encoder, the intensity and/or color temperature will revert to the previously saved setting. Pressing the right button will 'split the difference' between the two settings, automatically making the light intensity and/or color temperature exactly midway between the range of the two previous settings as indicated in FIG. 15. Rotary control will then allow the user to quickly toggle between the three. Multiple light settings can be recorded as presets, to be recalled, averaged, or otherwise referenced either in remote control, local control, or other to be discussed or developed control paradigms.

Another embodiment of the present invention allows for split screen remote control from light to light. For example, in a production system with two lights, light 1 and light 2 are addressed as such and controlled separately, where light 1 is remotely located and light 2 is local and accessible. In this scenario, from the locally accessible light 2, the remotely located light 1 could be adjusted by splitting the control display in half, with half of the display pertaining to the controls of the local light, and the other half of the display corresponding to the controls of the remote light. Therefore, in this example where light 1 is adjacent to a window, and light 2 is in the middle of the room, 5' from the window, settings can be copied or matched as they are adjusted for the differing ambient environment of each light.

By distributing control of each light across a wireless or wired network, all data and settings can be accessed from any light or from an application on a smart phone, tablet or personal computer, or a dedicated controller device, trigger, or accessory. The data and settings from each light can be saved or shared through various means, enabling the user to recreate the settings of each light at a later time or different location. These settings also can be transferred to different lights or to multiple lights, as long as their network key or other security means is adjusted to match the network key or other security means of the lights whose settings were saved. These settings or data can be saved and shared beyond their original setup, in various ways through an application on a smart phone, tablet or personal computer, a website, forum, or exchange. For example, the user can take a photo of a lighting set up through the application and have the saved lighting parameters linked or embedded within the photo, allowing the user to reference said photo at a later time in order to recreate that lighting setup or share the photo with all lighting parameters embedded, attached or linked to other users.

Isolated and independent drivers or a driver array are employed for each emitter board or cluster, allowing for a modular design that can be easily configured to fit the needs of each production [FIG. 3, #12]. This results from a digital bus that can supply alternate emitter boards or emitter boards with multiple driver clusters. This enables future pixel mapping, additional color channels (eg: one embodiment combines white 2700K and 5600K, while another embodiment combines white 2700K, white 6500K, white 10000K, Red, Indigo, and Lime Green). Analog signaling, no matter how many signal pins are reserved, has an upper limit fixed at the number of reserved pins, analog signal bandwidth, and degradation by connection points, available bus current, noise, or combinations of all of these factors. A digital bus, given a fast enough clock speed, is nearly unlimited in channel potential and delivers much greater reliability in signal propagation.

Further amplifying the modular nature of the present invention, each of the stand-alone instruments functions as a subpanel [FIG. 6, #19-21] of one larger light source. The enclosures of these sub-panels can be instantly and easily linked together to form larger light sources of a multitude of shapes and sizes. When a smaller light is required, the sub-panels can function alone as an independent light source. In one embodiment, the enclosures of each sub-panel features a unique set of fittings, rivets, barbs, or magnetic inserts around which a mounting surface can secure. When integrated into a larger group of panels, a backplate or multiple backplates attaches in the same manner. [FIG. 8, #23] This eliminates the need of any additional brackets or hardware while providing a flexibility of backplate positioning.

In a typical configuration, a backplate, comprising a flat mounting surface, plate or area, an adjustable articulating arm or fixed stud, or other mechanical means of attaching a light to a stand or rigging hardware that is common within the film industry is employed to install the present invention in various positions. All mounting and affixing of that backplate to a light is enabled by magnets and magnetic arrays [FIG. 11, #29]. The arrays are distributed such that any backplate can mount to one, two, or more lights by rotating the backplate 90° to the primary long axis of the light instrument body [FIG. 8, #23]. In addition, multiple mounting arrays or moveable arrays are provided along that long axis enabling several points at which the backplate can attach, for example the ends, middle, or thirds. This makes for modularity of mounting and of mounting hardware since multiple plates can be used on a single light, for example in scenarios when attached to a moving vehicle, when the utmost of mounting rigidity and flexibility is required, when mounted in an awkward position requiring unique mounting points, when reducing stands and hardware, when multiple lights are used in the same position, or when mounting directly to magnetically responsive materials such as door frames, pipes.

In the preferred embodiment of the present invention, the array of magnets [FIG. 11, #29] shall be comprised of magnetic cylinders or sleeves [FIG. 9, #24] such that they are hollow from end to end, leaving a space for a pin, screw, bolt, or other hardware to pass through. Each magnetic sleeve has a mechanically secure fitting embedded below [FIG. 9, #25], for example a threaded, bayonet, or twist-secure insert or machined form. This small feature enables a mechanical security fastener to be installed in addition to the magnetic array's holding force. Further, the mechanical fastener(s) incorporate a loop, ring, or clasp [FIG. 9, #26] such that a safety cable can be attached as is standard in the rigging of film and television lighting instruments. Therefore, in one small piece of hardware with well-formed features behind it, a user gets rapid setup/adjustment/removal, fail-security, and fall prevention. This greatly increases speed, reliability, safety, and decreases the costs when compared to other techniques for achieving the same. Other systems require separate hardware and installation steps for each step of the rigging process or simply lack the ability to perform one or more of those steps.

Additionally, when coupled together, multiple panels may share the same control logic enabling the user to adjust intensity, color, effects, or other parameters from any control point on any sub-panel and effect such parameters on the entire group of sub-panels. This can be achieved by detecting magnetic coupling, wirelessing sensing proximity, or user interaction through the setting the "Light Source ID" or "Address" of each sub-panel to match. Wireless communications between the panels or electrical signaling through the magnetic couplings enables the sharing of light control parameters.

Most lights employ an all metal enclosure or nearly all metal enclosure for strength and heat dissipation. However, polycarbonate and other composites are very rigid and save a lot of weight, and, if carefully chosen, composites can exceed the recyclability and strength-to-weight ratio of metals. The preferred embodiment of the present invention combines highly recyclable metals such as aluminum with highly durable and recyclable plastics to extract the best in performance of both. This embodiment integrates an aluminum extrusion "emitter tube" light body with plastic clamshell components. The clamshell contains an electronics control module with power conversion, a microprocessor, memory, and wireless transceiver(s). This attaches to the light body as a module, which is designed such that the installation is easy enough to be performed in field by the end user. The emitter tube/light body is manufactured out of aluminum to maximize strength-to-weight and to optimize thermal performance by performing heat sinking duties. In an alternative embodiment, such as when assembling a much larger light is required, the aluminum emitter tubes comprise a structural skeleton, while continuing to perform both heat sinking and structural roles. More composite parts can be used to round out the overall form of the light while adding minimal additional weight. In yet another alternative embodiment, in a much smaller form, a light's structure would be entirely an aluminum or other high thermally conductive metal milled, lathed, or otherwise manufactured to contain the various emitter, logic, and power modules.

Another embodiment of the present invention enables another alternative method of tuning color temperature or adjusting color balance. Instead of an array of multiple color temperature or color emission sources, the alternative embodiment may include a small rotating disc, sliding cover plate, or other precisely positioned phosphorescent, quantum dot, or other wavelength converting cover [FIG. 10, #27]. The cover has a graduated and continuously varying mix of color-temperature-tuned wavelength conversion substances. By precisely adjusting the relative position of the disc or other covering plate, the color temperature can be continuously varied and adjusted smoothly. [FIG. 10]. The underlying emitters effectively become light pumps [FIG. 10, #28], which can be dimmed, flashed, or otherwise manipulated without color temperature varying. The emitters will all be either blue, violet, or some other more desirable light pump LED, thus obviating the need to combine multiple emitter types on the same board. No light is consumed to achieve a color rebalance, no physical interaction is required, and no additional equipment or accessories are necessary to adjust the color temperature. This allows the light to be placed in a different or inaccessible position and both color and intensity can be adjusted remotely without any loss of efficiency or imposed granularity on the color spectrum. By separating the phosphor from the emitter, great gains in color accuracy, thermal stability, and luminous efficacy become possible.

An optical style diffuser film or optic is installed in front of the emitters to blend the colors together into one uniform light source. Similar to a micro-lense array in a DSLR camera, the optical diffusing film, optical module, or translucent is modularized [FIG. 1, #5] such that an overall diffuser can be replaced by smaller modules and mixed. Advantageously, in the present invention, this optical diffusing film does not have to be homogenous, so the user can install a long throw narrow optic in the middle segments of the light and a wide spread super diffuse optic at the periphery for lighting effect or optimization. Magnets may also be used to attach each module to the light frame or emitter board.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A lighting platform comprising:
an enclosure,
a logic module housed within said enclosure,
at least one lighting element operatively connected to said logic module, and
a power source,
wherein said logic module further comprises
networking means,
processing means, and
a control unit configured to allow user control of the at least one lighting element, and
wherein said at least one lighting element further comprises a magnetic attachment element operatively connected to the logic module.

2. The lighting platform of claim 1,
wherein said lighting platform is expandable via magnetic attachment means, and
wherein control of the lighting platform is distributed across the coupled lighting elements.

3. The lighting platform of claim 1,
wherein said lighting platforms are operatively connected to each other by wireless or wired networking means.

4. The lighting platform of claim 3,
wherein said wireless or wired networking means includes wirelessly sensing proximity, and wherein the logic module is configured to detect proximity.

5. The lighting platform of claim 3,
wherein said wireless or wired networking means includes matching the user-inputted setting "light source id" or "address" of each subpanel.

6. The lighting platform of claim 3,
wherein said wireless or wired networking means includes detecting magnetic coupling of multiple panels, and
wherein the logic module is configured to detect coupling.

7. The lighting platform of claim 1,
wherein said lighting platform further comprises an optical style diffuser film or modularized optic installed in front of the emitters.

8. The lighting platform of claim 7
wherein magnets are configured to attach to the optical style diffuser film or modularized optic to the light frame or emitter board.

9. The lighting platform of claim 7
wherein the optical style diffuser film or modularized optic are of the same optical dispersion/focusing qualities.

10. The lighting platform of claim 7
wherein the optical style diffuser film or modularized optic are of differing optical dispersion/focusing qualities.

11. The lighting platform of claim 7
wherein the optical style diffuser film or modularized optic's light interaction is homogenous and isotropic across its surface.

12. The lighting platform of claim 7
wherein the optical style diffuser film or modularized optic's light interaction varies across its surface.

13. The lighting platform of claim 7
wherein the optical style diffuser film or modularized optic acts as a beam angle limiting device.

14. The lighting platform of claim 1,
wherein said lighting platform includes mounting means distributed across the exterior of the enclosure of the light.

15. The lighting platform of claim 14,
wherein said mounting means are comprised of magnets arranged in a grid.

16. The lighting platform of claim 14,
wherein said mounting means are comprised of a single strong magnet.

17. The lighting platform of claim 14,
wherein said mounting means are comprised of a concentric pair of magnets.

18. The lighting platform of claim 14,
wherein said mounting means are comprised of a pair of magnets.

19. The lighting platform of claim 14,
wherein said mounting means comprises:
a magnetic cylinder with the hole aligned to the magnetic polar axis connecting means which passes through the magnetic cylinder; and
wherein said connecting means has a closed hook, loop, or permanently attached clasp which secures to a safety cable or chain.

20. The lighting platform of claim 14,
wherein the distribution of said mounting means is such that a backplate can mount to multiple lights by rotating the backplate 90° to the primary axis of the lighting platform.

21. The lighting platform of claim 14,
wherein said mounting means is a frame comprising:
a frame of aluminum or other material of high thermal conductivity
wherein said frame holds a plastic clamshell component containing an electronics control module
an aluminum emitter tube which serves as a structural skeleton.

22. A method of controlling the lighting platform of claim 1,
wherein control of the lighting platform can be achieved from multiple sources simultaneously.

23. The method of claim 22,
wherein said control can be had at any logic module in the lighting platform.

24. The method of claim 22,
wherein said control can be had from an application on a smart phone, tablet or personal computer.

25. The method of claim 22,
wherein said settings from each light can be saved or shared.

26. The method of claim 22,
wherein said settings can be transferred to different lights.

27. The method of claim 22,
wherein said control can be had from a dedicated controller device.

28. The method of claim 27,
wherein said dedicated controller device is a rotary encoder to adjust color temperature and brightness.

29. The method of claim 28,
wherein said rotary controller is programmed by holding down the rotary encoder to save the current setting of color temperature and brightness.

30. The method of claim 28,
wherein said rotary controller is programmed by double clicking the rotary encoder to revert back to the previously saved setting of color temperature and brightness.

31. The method of claim 28,
wherein said rotary controller is programmed to set the color temperature and brightness exactly midway between the range of the current and previous color temperature and brightness.

32. The method of claim 28,
wherein said rotary encoder is controlled by rotating the encoder to switch between programmed settings and clicking the encoder to select the programmed setting.

33. A lighting platform comprising,
an enclosure,
a logic module housed within said enclosure,
at least one lighting element operatively connected to said logic module, and
a power source,
    wherein said logic module further comprises
        networking means,
        processing means, and
        a control unit configured to allow user control of the at least one lighting element, and
    at least one adjustable lighting element optic comprising at least one of:
        phosphorescent chemicals that convert narrowband light energy into broadband white light; or
        quantum dot material that converts narrowband light energy into broadband white light; or
        other wavelength converting material that converts narrowband light energy into broadband white light.

34. The lighting platform of claim 33,
wherein said lighting platform includes microprocessor to control the lighting element optic's position such that a color mix can be derived repeatedly.

35. The lighting platform of claim 33,
wherein an additional lighting element optic or multiple additional lighting element optics which stack atop or overlap alongside allows wavelength conversion media to mix or avoid mixture.

36. The lighting platform of claim 33,
wherein said lighting element optic is repeated across an array of emitters.

37. A lighting platform comprising,
an enclosure,
a logic module housed within said enclosure,
at least one lighting element operatively connected to said logic module, and
a power source,
    wherein said logic module further comprises
        networking means,
        processing means, and
        a control unit configured to allow user control of the at least one lighting element, and
    at least one lighting element optic comprising at least one of:
        phosphorescent chemicals that convert narrowband light energy into broadband white light; or
        quantum dot material that converts narrowband light energy into broadband white light; or
        other wavelength converting material that converts narrowband light energy into broadband white light, and
    wherein said at least one lighting element optic comprises wavelength conversion material of non-uniform or non-homogenous distribution such that it:
    is of graduated density on a clear base.

38. A lighting platform comprising:
an enclosure,
a logic module housed within said enclosure which is operatively configured to be controlled by a switching algorithm,
at least one lighting element operatively connected to said logic module, and
a power source,
wherein said logic module is configured to
    control said emitters in a manner that avoids a repeating switching pattern, or
    randomize the switching pattern so the waveform does not look like a repetitive square wave.

39. The lighting platform of claim 38,
wherein said logic module is further configured to modulate the waveform to achieve an average intensity.

40. The lighting platform of claim 38,
wherein said logic module is configured to control said lighting element by a combination of current regulation and said switching algorithm.

41. The lighting platform of claim 38,
wherein at least two lighting elements are operative connected to each other.

42. The lighting platform of claim 41,
wherein control of the lighting platform is distributed across the coupled lighting elements.

43. The lighting platform of claim 41,
wherein said logic module is configured to apply said switching algorithm to lighting elements in groups, and
wherein the switching cycles of each group are out of phase.

44. The lighting platform of claim 33,
wherein said lighting element optic is moveable.

45. The lighting platform of claim 44,
wherein said lighting element optic includes adjustable means to change the relative position of the lighting element optic over a specific emitter or cluster of emitters.

* * * * *